Nov 1, 1949.  A. HACSKAYLO  2,486,402
AUTOMATIC CONTROL SYSTEM
Filed Sept. 13, 1946  4 Sheets-Sheet 1

Inventor
Andrew Hacskaylo
By M. A. Hayes
Attorney

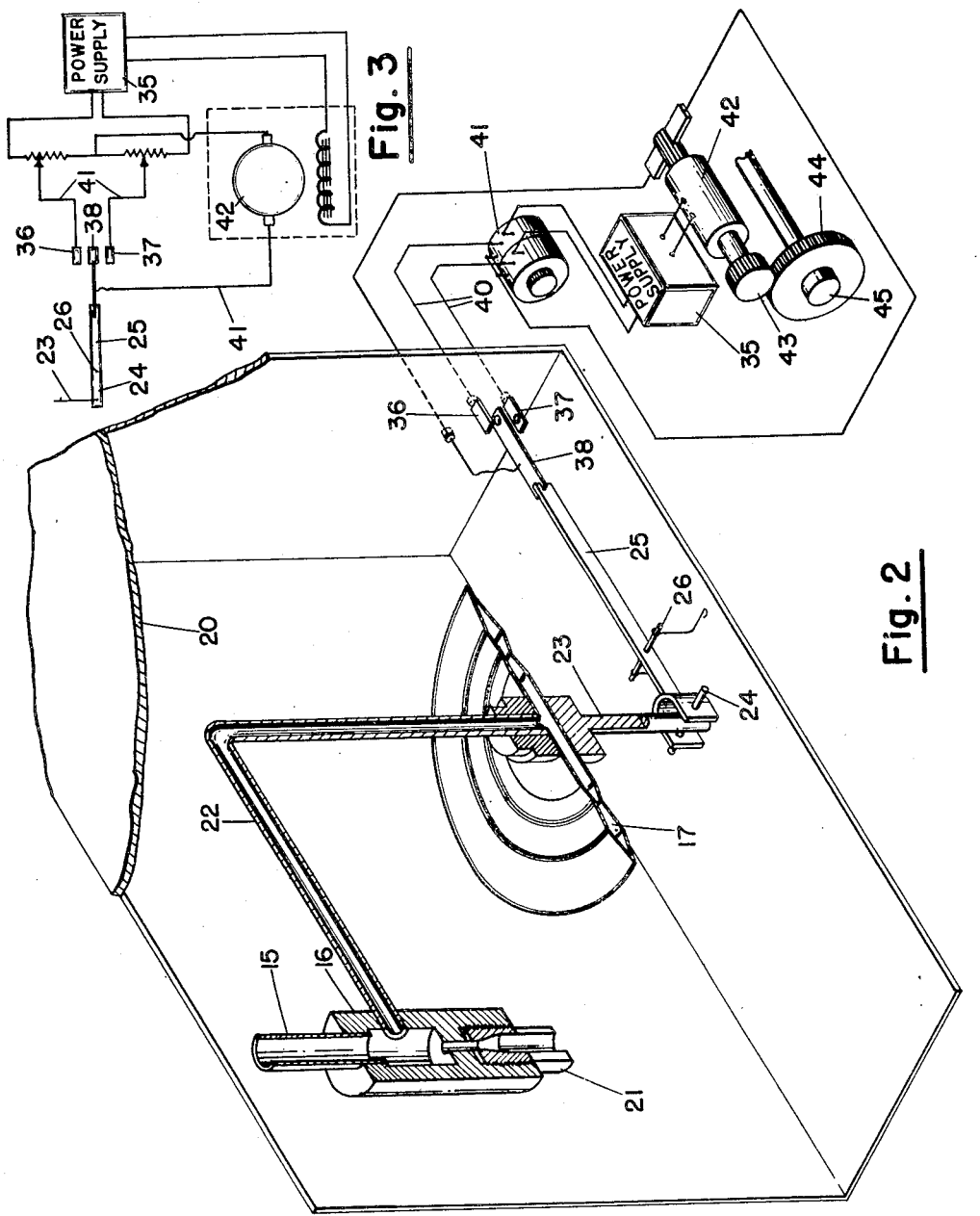

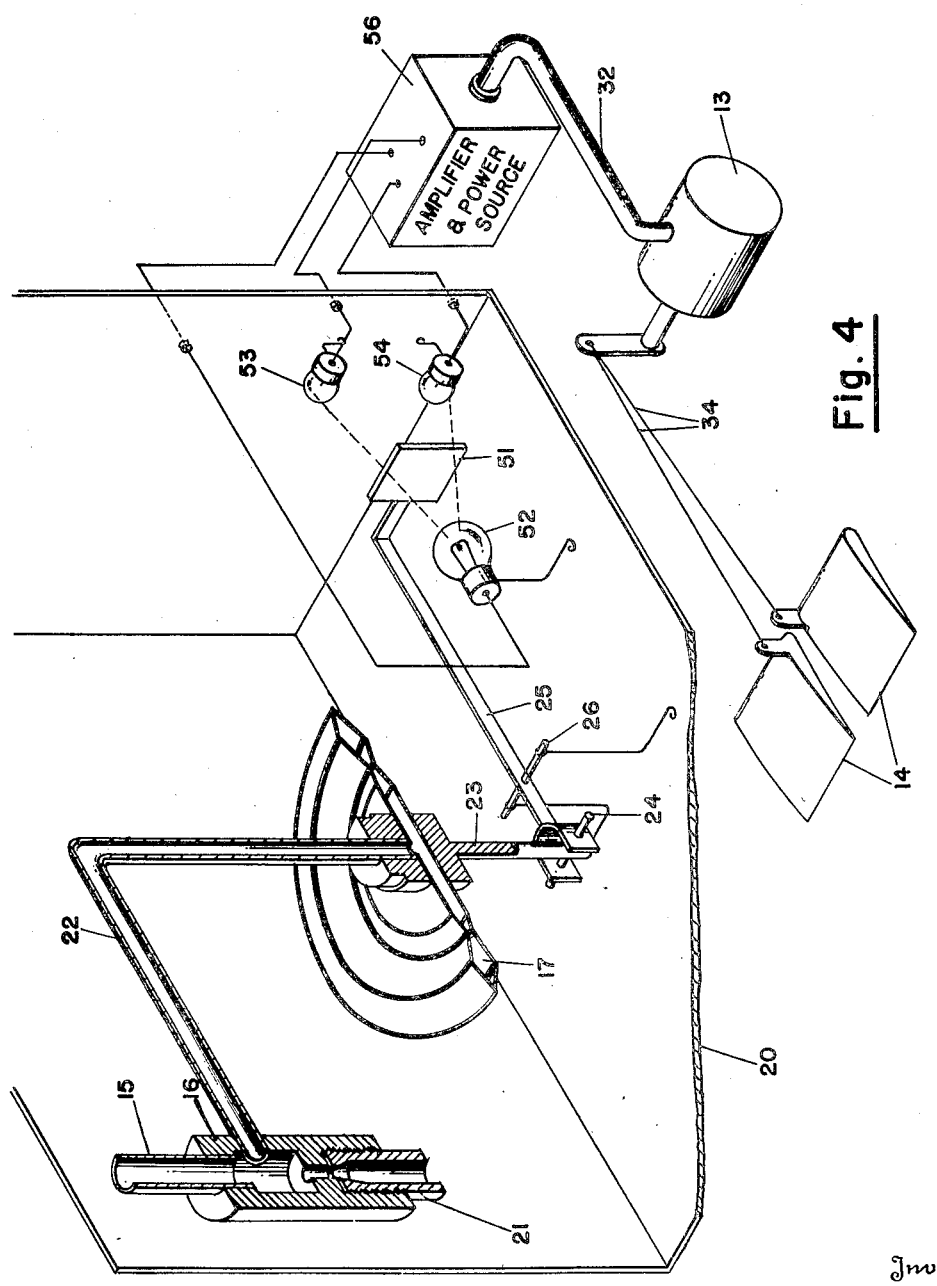

Inventor
Andrew Hacskaylo

Patented Nov. 1, 1949

2,486,402

UNITED STATES PATENT OFFICE 2,486,402

AUTOMATIC CONTROL SYSTEM

Andrew Hacskaylo, Hampton, Va.

Application September 13, 1946, Serial No. 696,982

2 Claims. (Cl. 318—481)

(Granted under the act of March 3, 1883, as amended April 30, 1928; 370 O. G. 757)

This invention relates to automatic control systems for aircraft, being particularly adapted to use with long range aircraft such as transport airplanes.

The invention resides in the provision of a rate-of-climb instrument sensitive to vertical velocities in an automatic control system for the elevators or other pitch or altitude control mechanism of the aircraft. In operation a rate-of-climb signal produced by the instrument is utilized to operate the elevators, elevator trim tabs, or equivalent controls.

An object of the invention is to provide apparatus sensitve to the rate-of-change of altitude of an aircraft for maintaining a desired altitude of the aircraft within very close limits.

Gyroscopic automatic pilots are effective to keep an aircraft in level flight within a few degrees, but it is well known that there is uncertainty in the maintenance of the level position since the constant altitude setting, corresponding to the null point, of an automatic pilot control unit actually has a finite width. There are two possible methods of reducing to a minimum the range over which an aircraft may change altitude without signal from the control unit. The method commonly employed in the prior art depends upon a displacement signal provided by an electronic or barometric altitude control unit, correction being provided whenever a substantial displacement from the desired altitude occurs.

This invention employs the second method depending upon a rate-of-change of altitude signal which tends to anticipate possible changes in altitude at their inception. The signal is utilized to cause a correcting control function to counteract the change in altitude as the change is initiated, rather than after a substantial change has occurred.

Further objects and advantages of the invention will be apparent from the following description when taken in conjunction with the drawings, in which:

Fig. 2 is a schematic presentation of a system incorporating a mechanical rate-of-change of altitude pick-up device in an automatic pilot system;

Fig. 3 is a wiring diagram of the electrical connections of the device disclosed in Fig. 2;

Fig. 4 is a schematic presentation of an automatic elevator control system employing a photo-cell type of rate-of-change of altitude pick-up device.

Figure 1:
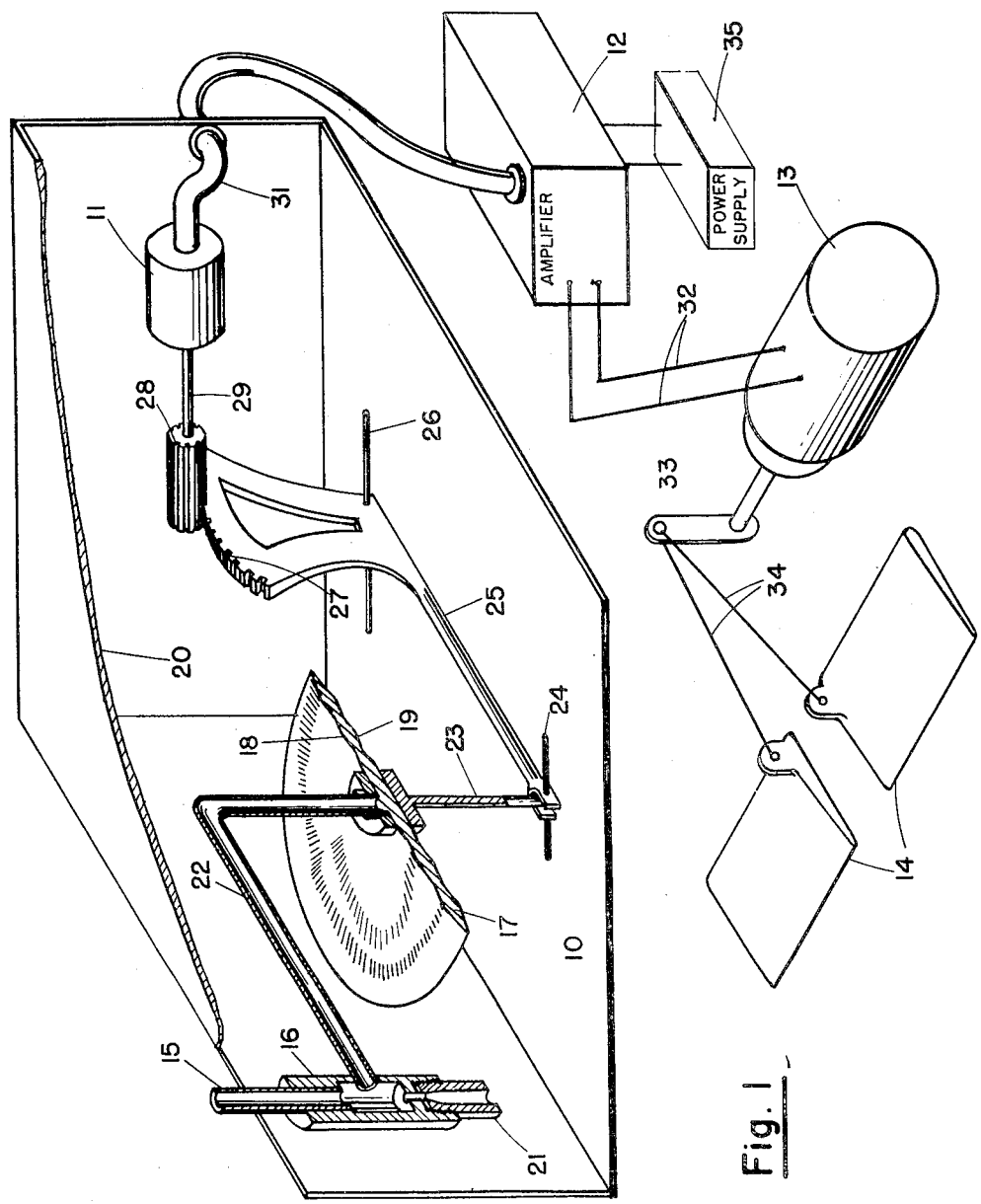
Fig. 1 is a schematic presentation of an automatic elevator control system for an aircraft employing a mechanical rate-of-change of altitude pick-up device.

The aircraft control disclosed in Fig. 1 consists of a rate-of-change of altitude pick-up device indicated generally at 10 including an electrical position indicator 11, such as a Selsyn generator, connected to feed an amplifier 12, the output of which drives a servo-motor 13 connected to control deflection of elevators 14. In the pick-up device, a pressure tube 15 is arranged to provide atmospheric pressure through a restrictor 16 to the inside of pressure sensitive capsule 17 comprised of an upper diaphragm 18 peripherally sealed to a lower diaphragm 19. Atmospheric pressure tube 15 is hermetically sealed through pressure-tight envelope 20. The pressure in the hermetically sealed chamber is made to follow changes in atmospheric pressure with a substantial lagging time differential, a difference between the atmospheric pressure and the pressure existing in the casing being equalized slowly through restricted passageway or orifice 21 built into restriction 16.

The upper diaphragm 18 of capsule 17 is securely fastened to stationary atmospheric pressure feeder tube 22, and the lower diaphragm 19 carries a rod 23 through which motion resulting from expansion or contraction of the capsule is longitudinally transmitted to a pivotal coupling 24. The motion is further transmitted through coupling 24 to cause rotation of member 25 about a pivot 26. Member 25 is constructed with a toothed segment 27 for cooperation with a toothed wheel or gear 28 mounted on the shaft 29 of Selsyn generator or transmitter 11. Electrical output from the generator is applied through conductors 31, hermetically sealed through and electrically insulated from casing 20, to a suitable electrical or electro-mechanical amplifier 12 which is connected by conductors 32 to servo-motor or receiver 13. Arm 33 of the servo-motor is arranged to deflect elevators 14 through control cables 34, or through a similar control linkage. Electric energy may be provided to the system from a source 35.

In operation, a slight change in the atmospheric pressure will produce compensating elevator deflection, and the extent of the deflection will be determined by the rate at which the change in atmospheric pressure occurs, rather than by the extent of the change. Accordingly, a rapid increase in atmospheric pressure will produce a large deflection of the elevators toward the climb position, a rapid decrease, a large deflection toward the dive position. A slow change produces a slight deflection.

The atmospheric pressure in tube 15 is balanced against the pressure in envelope 20 through the action of capsule 17. The atmospheric pressure and the pressure in the casing tend to slowly equalize through restricted passageway 21. An increase in atmospheric pressure will tend to expand capsule 17 resulting in movement of diaphragm 19 away from diaphragm 18 which is held in a stationary position at its center by tube 22. The motion of the center of diaphragm 19 is transmitted through rod 23, pivotal coupling 24, member 25 and toothed segment 27 to gear wheel 28. Rotation of the gear wheel produces an electrical output from the generator or transmitter 11 of a self-synchronous system which is fed to an amplifier 12. The amplified output is supplied to a servo-motor or receiver 13 which rotates in the direction determined by the direction of rotation of the gear wheel 28 and by a number of degrees of rotation proportional to the degrees of rotation of the gear wheel. The servo-motor, accordingly, is connected so as to follow expansion of capsule 17 resulting from decreasing altitude of the aircraft, the displacement of the arm 33 of the servo-motor being proportioned to the rate of decrease of altitude and in a predetermined direction. The motion of the servo-motor in response to a decrease in altitude is in the direction to raise the trailing edges of elevators 14 through a suitable control linkage, such as control cables 34. Increasing altitude, as will be apparent, causes opposite servo-motor rotation to lower the trailing edges of the elevator to provide control toward a diving attitude. The extent of elevator deflection will be in each instance proportioned to the rate-of-change of altitude.

The device disclosed in Fig. 2 comprises an atmospheric pressure tube 15, restrictor 16, with restricted passageway 21, tube 22, capsule 17, and rod 23 enclosed in hermetic casing 20 as described in connection with Fig. 1. The member 25 of Fig. 2, mounted for rotation about a pivot 26, selectively energizes contacts 36 and 37 by engagement of contact 38 carried by member 25 as determined by expansion and contraction, respectively, of the capsule acting on the rod 23 and pivotal coupling 24. From the contacts 36 and 37, conductors 40 connect with a rheostat 41 which is used as a speed control for a motor 42 as shown by Fig. 3. Electrical connections between the rheostat 41, the power supply 35, and the rotor and stator windings of the motor 42 are also shown by Fig. 3. Thus, as contact is made between contact 38 and contact 36 or 37, the motor will rotate clockwise or counterclockwise, respectively, at a speed determined by the position of the selective contacts of resistor 41. The selective contacts are customarily designated "speed control." The pinion 43 and gear 44 form a clutch which is shown engaged in Fig. 2. By pulling knob 45, the gear 44 will move forward thus disengaging the clutch and hence the action of the pinion 43 on the gear 44. In automatic operation with the pinion and gear engaged, the motor 42 applies a torque to pinion 43 and thus gear 44 and knob 45. In autopilot installations, the knob 45 would be equivalent to the elevator control knob on the control panel of the automatic pilot wherein manual manipulation of the knob operates the elevators of the aircraft. With the use of the proposed invention in cooperation with the autopilot, the elevators will be operated in accordance with the rate of change of altitude linked as described to operate the motor 42, thus automatically manipulating the knob 45. If it is desired to operate the elevator control knob of the autopilot manually, this may be done by disengaging the pinion 43 and gear 44, or by incorporating into the electrical circuit an on-off electrical switch.

The device disclosed in Fig. 4 comprises an atmospheric pressure tube 15, restrictor 16 with restricted passageway 21, tube 22, capsule 17, and rod 23 enclosed in hermetic casing 20 as previously described in connection with Figs. 1 and 2. The member 25 of Fig. 4, mounted for rotation about a pivot 26 as before, is now provided with a shutter 51 at its outer end attached rigidly thereto. In the position shown, the shutter allows the passage of light rays from a source of light 52 to photocells 53 and 54, the three elements 52, 53 and 54 being properly connected to and energized by an amplifier and power source 56. As the arm 25 rotates about its pivot 26 in accordance with the rate of ascent or descent of the aircraft, the shutter is moved downward or upward and thus blocks the light rays reaching the photocell 54 or 53 thereby increasing the light intensity on the opposite photocell 53 or 54 respectively. Such variations in light intensity on the photocells produce a current which is proportional to the ascent or descent rate of the aircraft. This proportional current after passing through the amplifier 56 controls the rate and direction at which the reversible servo-motor 13 operates. As in Fig. 1, the servo-motor 13 of Fig. 3 is arranged to deflect elevators 14 through control cables 34, or through a similar control linkage.

Although the controlled servo-motor 42 of Fig. 2 acts in cooperation with an automatic pilot, the servo-motor 42 could be utilized to operate the control elevators in the manner described in conjunction with Figs. 1 and 4; and conversely, the servo-motors 13 of Figs. 1 and 4 could act in cooperation with an automatic pilot as does the servo-motor 42 of Fig. 2.

Figure 5:
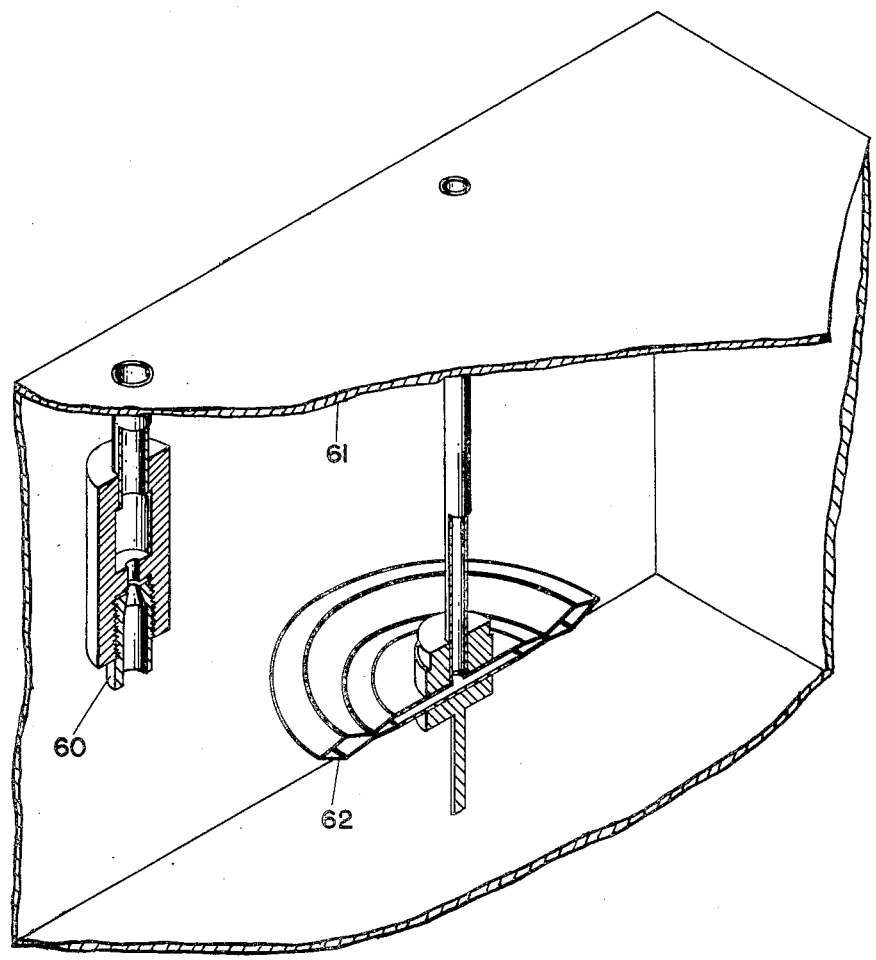
Fig. 5 is an alternate arrangement of several of the elements of the device described.

Fig. 5 shows an alternate location for the restricted passageway 60. This location in the casing of the hermetically sealed chamber 61 allows the capsule 62 to be directly communicating with the atmosphere, the restricted passageway 60 acting as before to control the movement of the capsule 62 in accordance with the rate-of-change of altitude.

Obviously this device could be used for vertical control in any pressure-varying fluid medium. A typical application would be in submarines wherein the medium is water whose pressure varies as depth and hence provides a means for the operation of the proposed device. Other possible applications using the altitude rate signal for obtaining longitudinal control include controlling the precession of a gyroscopic longitudinal pitch control unit, integrating with a barometric altitude control unit, and other control functions familiar to those skilled in the art.

The invention described herein may be manufactured and used by or for the Government of the United States of America for governmental purposes without the payment of any royalties thereon or therefor.

What is claimed is:

1. For use in combination with a craft having shiftable control surfaces, a rate of climb device having an electrical contact element that swings in response to pressure variations, a reversible electric motor having one side connected to said contact element, a pair of contacts adjacent said element, a pair of manually variable resistances connected between said contacts and the other side of said motor, and means engaged by said motor to shift said control surfaces.

2. In the system defined in claim 1, said means including a manually operable clutch through which said motor may be disengaged.

ANDREW HACSKAYLO.

REFERENCES CITED

The following references are of record in the file of this patent:

UNITED STATES PATENTS

| Number | Name | Date |
| --- | --- | --- |
| 1,338,358 | Champlin | Apr. 27, 1920 |
| 2,077,267 | Rogers | Apr. 13, 1937 |
| 2,203,671 | Carlson | June 11, 1940 |
| 2,275,719 | Bevins | Mar. 20, 1942 |
| 2,315,501 | Crane et al. | Apr. 6, 1943 |